US008139820B2

(12) United States Patent
Plante et al.

(10) Patent No.: US 8,139,820 B2
(45) Date of Patent: Mar. 20, 2012

(54) DISCRETIZATION FACILITIES FOR VEHICLE EVENT DATA RECORDERS

(75) Inventors: James Plante, Del Mar, CA (US); Ramesh Kasavaraju, San Diego, CA (US); Gregory Mauro, La Jolla, CA (US); Andrew Nickerson, San Diego, CA (US)

(73) Assignee: Smartdrive Systems Inc., San Diego, CA (US)

( * ) Notice: Subject to any disclaimer, the term of this patent is extended or adjusted under 35 U.S.C. 154(b) by 1045 days.

(21) Appl. No.: 11/637,754

(22) Filed: Dec. 13, 2006

(65) Prior Publication Data
US 2008/0147266 A1 Jun. 19, 2008

(51) Int. Cl.
*G06K 9/00* (2006.01)
*B60Q 1/00* (2006.01)
*G01M 17/00* (2006.01)

(52) U.S. Cl. .................. 382/104; 340/438; 701/35
(58) Field of Classification Search .............. 382/104; 348/148; 340/438, 439, 440, 870.41; 701/29, 701/34, 35
See application file for complete search history.

(56) References Cited

U.S. PATENT DOCUMENTS

| | | | |
|---|---|---|---|
| 4,853,856 A | 8/1989 | Hanway | |
| 4,853,859 A | 8/1989 | Morita et al. | |
| 4,866,616 A | 9/1989 | Takeuchi et al. | |
| 4,926,331 A | 5/1990 | Windle et al. | |
| 4,992,943 A | 2/1991 | McCracken | |
| 5,046,007 A | 9/1991 | McCrery et al. | |
| 5,185,700 A * | 2/1993 | Bezos et al. | 701/35 |
| 5,224,211 A | 6/1993 | Roe | |
| 5,305,214 A * | 4/1994 | Komatsu | 701/35 |
| 5,305,216 A * | 4/1994 | Okura et al. | 701/35 |
| 5,446,659 A | 8/1995 | Yamawaki | |
| 5,546,305 A | 8/1996 | Kondo | |
| 5,548,273 A | 8/1996 | Nicol et al. | |
| 5,570,087 A | 10/1996 | Lemelson | |
| 5,570,127 A | 10/1996 | Schmidt | |
| 5,581,464 A | 12/1996 | Woll et al. | |
| 5,586,130 A | 12/1996 | Doyle | |
| 5,805,079 A | 9/1998 | Lemelson | |
| 5,815,071 A | 9/1998 | Doyle | |
| 5,815,093 A | 9/1998 | Kikinis | |
| 5,819,198 A | 10/1998 | Peretz | |
| 5,919,239 A | 7/1999 | Fraker et al. | |
| 6,002,326 A | 12/1999 | Turner | |
| 6,060,989 A | 5/2000 | Gehlot | |
| 6,067,488 A | 5/2000 | Tano | |
| 6,076,026 A | 6/2000 | Jambhekar et al. | |
| 6,088,635 A | 7/2000 | Cox et al. | |
| 6,141,611 A * | 10/2000 | Mackey et al. | 701/35 |

(Continued)

*Primary Examiner* — Abolfazl Tabatabai
(74) *Attorney, Agent, or Firm* — Integrity IP; Joseph Page

(57) ABSTRACT

Exception event recorders and analysis systems include: vehicle mounted sensors arranged as a vehicle event recorder to capture both discrete and non-discrete data; a discretization facility; a database; and an analysis server all coupled together as a computer network. Motor vehicles with video cameras and onboard diagnostic systems capture data when the vehicle is involved in a crash or other anomaly (an 'event'). In station where interpretation of non-discrete data is rendered, i.e. a discretization facility, captured data is used as a basis for production of supplemental discrete data to further characterize the event. Such interpreted data is joined to captured data and inserted into a database in a structure which is searchable and which supports logical or mathematical analysis by automated machines. A coupled analysis server is arranged to test stored data for prescribed conditions and upon finding such, to initiate further actions appropriate for the detected condition.

19 Claims, 9 Drawing Sheets

U.S. PATENT DOCUMENTS

| | | |
|---|---|---|
| 6,185,490 B1 | 2/2001 | Ferguson |
| 6,195,605 B1 | 2/2001 | Tabler et al. |
| 6,208,919 B1 | 3/2001 | Barkesseh et al. |
| 6,246,933 B1 | 6/2001 | Bague |
| 6,246,934 B1 | 6/2001 | Otake et al. |
| 6,298,290 B1 | 10/2001 | Abe et al. |
| 6,333,759 B1 | 12/2001 | Mazzilli |
| 6,349,250 B1 | 2/2002 | Hart et al. |
| 6,356,823 B1 | 3/2002 | Iannotti et al. |
| 6,360,147 B1 | 3/2002 | Lee |
| 6,389,339 B1 | 5/2002 | Just |
| 6,389,340 B1 | 5/2002 | Rayner |
| 6,405,112 B1 | 6/2002 | Rayner |
| 6,411,874 B2 | 6/2002 | Morgan et al. |
| 6,421,080 B1 | 7/2002 | Lambert |
| 6,449,540 B1 | 9/2002 | Rayner |
| 6,459,988 B1 | 10/2002 | Fan et al. |
| 6,470,241 B2 | 10/2002 | Yoshikawa |
| 6,472,771 B1 | 10/2002 | Frese et al. |
| 6,493,650 B1 | 12/2002 | Rodgers et al. |
| 6,505,106 B1 | 1/2003 | Lawrence et al. |
| 6,516,256 B1 | 2/2003 | Hartmann et al. |
| 6,518,881 B2 | 2/2003 | Monroe |
| 6,525,672 B2 | 2/2003 | Chainer et al. |
| 6,529,159 B1 | 3/2003 | Fan et al. |
| 6,535,804 B1 | 3/2003 | Chun |
| 6,552,682 B1 | 4/2003 | Fan |
| 6,556,905 B1 | 4/2003 | Mittelsteadt et al. |
| 6,580,983 B2 | 6/2003 | Laguer-Diaz et al. |
| 6,594,576 B2 | 7/2003 | Fan et al. |
| 6,611,740 B2 | 8/2003 | Lowrey et al. |
| 6,611,755 B1 | 8/2003 | Coffee et al. |
| 6,629,029 B1 | 9/2003 | Giles |
| 6,629,030 B2 | 9/2003 | Klausner et al. |
| 6,636,791 B2 | 10/2003 | Okada |
| 6,664,922 B1 | 12/2003 | Fan |
| 6,684,137 B2 | 1/2004 | Takagi et al. |
| 6,694,483 B1 | 2/2004 | Nagata |
| 6,701,234 B1 | 3/2004 | Vogelsang |
| 6,718,239 B2 | 4/2004 | Rayner |
| 6,721,640 B2 | 4/2004 | Glenn et al. |
| 6,728,612 B1 | 4/2004 | Carver et al. |
| 6,732,031 B1 | 5/2004 | Lightner et al. |
| 6,732,032 B1 | 5/2004 | Banet et al. |
| 6,735,503 B2 | 5/2004 | Ames |
| 6,737,954 B2 | 5/2004 | Chainer et al. |
| 6,739,078 B2 | 5/2004 | Morley et al. |
| 6,745,153 B2 | 6/2004 | White et al. |
| 6,748,305 B1 | 6/2004 | Klausner et al. |
| 6,760,757 B1 | 7/2004 | Lundberg et al. |
| 6,795,017 B1 | 9/2004 | Puranik et al. |
| 6,795,111 B1 | 9/2004 | Mazzilli |
| 6,795,759 B2 | 9/2004 | Doyle |
| 6,804,590 B2 | 10/2004 | Sato et al. |
| 6,810,362 B2 | 10/2004 | Adachi et al. |
| 6,812,831 B2 | 11/2004 | Ikeda |
| 6,819,989 B2 | 11/2004 | Maeda et al. |
| 6,831,556 B1 | 12/2004 | Boykin |
| 6,832,140 B2 | 12/2004 | Fan et al. |
| 6,832,141 B2 | 12/2004 | Skeen et al. |
| 6,836,712 B2 | 12/2004 | Nishina |
| 6,842,762 B2 | 1/2005 | Raithel et al. |
| 6,847,873 B1 | 1/2005 | Li |
| 6,850,823 B2 | 2/2005 | Eun et al. |
| 6,859,695 B2 | 2/2005 | Klausner |
| 6,862,524 B1 | 3/2005 | Nagda et al. |
| 6,865,457 B1 | 3/2005 | Mittelsteadt et al. |
| 6,867,733 B2 | 3/2005 | Sandhu et al. |
| 6,882,313 B1 | 4/2005 | Fan et al. |
| 6,898,492 B2 | 5/2005 | de Leon et al. |
| 6,919,823 B1 | 7/2005 | Lock |
| 6,922,566 B2 | 7/2005 | Puranik et al. |
| 6,928,348 B1 | 8/2005 | Lightner et al. |
| 6,931,309 B2 | 8/2005 | Phelan et al. |
| 6,947,817 B2 | 9/2005 | Diem |
| 7,020,548 B2 | 3/2006 | Saito et al. |
| 7,039,510 B2 | 5/2006 | Gumpinger |
| 7,076,348 B2 | 7/2006 | Bucher et al. |
| 7,082,359 B2 * | 7/2006 | Breed ............................. 701/36 |
| 7,113,853 B2 | 9/2006 | Hecklinger |
| 7,117,075 B1 | 10/2006 | Larschan et al. |
| 2001/0005217 A1 | 6/2001 | Hamilton et al. |
| 2001/0005804 A1 | 6/2001 | Rayner |
| 2001/0018628 A1 | 8/2001 | Jenkins et al. |
| 2001/0020204 A1 | 9/2001 | Runyon et al. |
| 2002/0019689 A1 | 2/2002 | Harrison et al. |
| 2002/0029109 A1 | 3/2002 | Wong et al. |
| 2002/0087240 A1 | 7/2002 | Raithel et al. |
| 2002/0091473 A1 | 7/2002 | Gardner et al. |
| 2002/0107619 A1 | 8/2002 | Klausner et al. |
| 2002/0169530 A1 | 11/2002 | Laguer-Diaz et al. |
| 2002/0183905 A1 | 12/2002 | Maeda et al. |
| 2003/0028298 A1 | 2/2003 | Macky et al. |
| 2003/0112133 A1 | 6/2003 | Webb et al. |
| 2003/0125854 A1 | 7/2003 | Kawasaki et al. |
| 2003/0154009 A1 | 8/2003 | Basir et al. |
| 2003/0177187 A1 * | 9/2003 | Levine et al. ................. 709/205 |
| 2004/0039503 A1 | 2/2004 | Doyle |
| 2004/0039504 A1 | 2/2004 | Coffee et al. |
| 2004/0044452 A1 | 3/2004 | Bauer et al. |
| 2004/0054444 A1 | 3/2004 | Abeska et al. |
| 2004/0070926 A1 | 4/2004 | Boykin et al. |
| 2004/0083041 A1 | 4/2004 | Skeen et al. |
| 2004/0088090 A1 | 5/2004 | Wee |
| 2004/0111189 A1 | 6/2004 | Miyazawa et al. |
| 2004/0138794 A1 | 7/2004 | Saite et al. |
| 2004/0181326 A1 | 9/2004 | Adams et al. |
| 2004/0210353 A1 | 10/2004 | Rice |
| 2004/0243285 A1 | 12/2004 | Gounder |
| 2004/0254698 A1 | 12/2004 | Hubbard et al. |
| 2005/0099498 A1 | 5/2005 | Lao et al. |
| 2005/0100329 A1 | 5/2005 | Lao et al. |
| 2005/0131597 A1 | 6/2005 | Raz et al. |
| 2005/0137796 A1 | 6/2005 | Gumpinger |
| 2005/0174217 A1 | 8/2005 | Basir et al. |
| 2005/0182538 A1 | 8/2005 | Phelan et al. |
| 2005/0228560 A1 | 10/2005 | Doherty et al. |
| 2005/0251304 A1 | 11/2005 | Cancellara et al. |
| 2005/0283284 A1 | 12/2005 | Grenier et al. |
| 2006/0030986 A1 | 2/2006 | Peng |
| 2006/0047380 A1 | 3/2006 | Welch |
| 2006/0095175 A1 | 5/2006 | deWaal et al. |
| 2006/0106514 A1 | 5/2006 | Liebl et al. |
| 2006/0122749 A1 | 6/2006 | Phelan et al. |
| 2006/0142913 A1 | 6/2006 | Coffee et al. |
| 2006/0178793 A1 | 8/2006 | Hecklinger |
| 2006/0212195 A1 | 9/2006 | Veith et al. |
| 2006/0229780 A1 | 10/2006 | Underdahl et al. |
| 2006/0247833 A1 | 11/2006 | Malhotra et al. |
| 2006/0259218 A1 | 11/2006 | Wu et al. |

* cited by examiner

DISCRETIZATION FACILITIES FOR VEHICLE EVENT DATA RECORDERS

BACKGROUND OF THE INVENTIONS

1. Field

The following invention disclosure is generally concerned with vehicle event recorders and more specifically concerned with recording systems including a video discretization facility and operation arranged to create discrete data relating to video image series and associate that discrete data with other digital data associated with the event in a database record.

2. Prior Art

The inventions presented in U.S. Pat. No. 6,947,817 by inventor Diem for nonintrusive diagnostic tools for testing oxygen sensor operation relates to a diagnostic system for testing a vehicle where such systems include a wireless communications link between a vehicle any remote network of server computers. In particular, a WiFi type access points allowed an analyzer to communicate by way the Internet with a server computer hosting and oxygen sensor SOAP (simple object access protocol) service. In a nutshell, the system relates to smog sensors for automobiles which communicate with remote servers by way of a WiFi communications links.

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller in nonvolatile memory, and an accident sensing interrupter. The oldest memory is overwritten by the newest images, until an accident is detected at which time the memory is blocked from further overwrites to protect the more vital images, which may include important information about the accident. Mr. Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interface.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'DriveCam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Remote reporting and manipulation of automobile systems is not entirely new. The following are very important teachings relating to some automobile systems having a wireless communications link component.

Inventors Fan et al, teach inventions of methods and systems for detecting vehicle collision using global positioning system GPS. The disclosure of Jun. 12, 2001 resulted in granted patent having number U.S. Pat. No. 6,459,988. A GPS receiver is combined with wireless technology to automatically report accident and third parties remotely located. A system uses the GPS signals to determine when an acceleration value exceeds the preset threshold which is meant to be indicative of an accident having occurred.

Of particular interest include inventions presented by inventors Nagda et al., in the document numbered U.S. Pat. No. 6,862,524 entitled using location data to determine trafficking route information. In this system for determining and disseminating traffic information or route information, traffic condition information is collected from mobile units that provide their location or position information. Further route information may be utilized to determine whether a mobile unit is allowed or prohibited from traveling along a certain route.

A common assignee, @Road Inc., owns the preceding two patents in addition to the following: U.S. Pat. Nos. 6,529,159; 6,552,682; 6,594,576; 6,664,922; 6,795,017; 6,832,140; 6,867,733; 6,882,313; and 6,922,566. As such, @Road Inc., must be considered a major innovator in position technologies arts as they relate to mobile vehicles and remote server computers.

General Motors Corp. teaches in U.S. Pat. No. 6,728,612, an automated telematics test system and method. The invention provides a method and system testing a telematics system in a mobile vehicle a test command from a test center to a call center is based on a test script. The mobile vehicle is continuously in contact by way of cellular communication networks with a remotely located host computer.

Inventor Earl Diem and Delphi Technologies Inc., had granted to them on Sep. 20, 2005, U.S. Pat. No. 6,947,817. The nonintrusive diagnostic tool for sensing oxygen sensor operation include a scheme or an oxygen analyzer deployed in a mobile vehicle communicates by way of an access point to a remotely located server. A diagnostic heuristic is used to analyze the data and confirm proper operation of the sensor. Analysis may be performed by a mainframe computer quickly note from the actual oxygen sensor.

Similar patents including special relationships between mobile vehicles and remote host computers include those presented by various inventors in U.S. Pat. Nos. 6,735,503; 6,739,078; 6,760,757; 6,810,362; 6,832,141; and 6,850,823.

Another special group of inventions owned by Reynolds and Reynolds Holding Inc., is taught first by Lightner et al, in U.S. Pat. No. 6,928,348 issued Aug. 9, 2005. In these inventions, Internet based emission tests are performed on vehicles having special wireless couplings to computer networks. Data may be further transferred to entities of particular interest including the EPA or California Air Resources Board, for example, or particular insurance companies and other organizations concerned with vehicle emissions and environment.

Other patents held by Reynolds and Reynolds Holding Inc., include those relating to reporting of automobile performance parameters to remote servers via wireless links. Specifically, an onboard data bus OBD system is coupled to a microprocessor, by way of a standard electrical connector.

The microprocessor periodically receives data and transmits it into the wireless communications system. This information is more fully described in U.S. patent granted Oct. 21, 2003 numbered U.S. Pat. No. 6,636,790. Inventors Lightner et al, present method and apparatus for remotely characterizing the vehicle performance. Data at the onboard data by his periodically received by a microprocessor and passed into a local transmitter. The invention specifically calls out transmission of data on a predetermined time interval. Thus these inventions do not anticipate nor include processing and analysis steps which result in data being passed at time other than expiration of the predetermined time period.

Reynolds and Reynolds Holding Inc., further describes systems where motor vehicles are coupled by wireless communications links to remote host servers in U.S. Pat. No. 6,732,031.

Additionally, recent developments are expressed in application for U.S. patent having document number: 2006/0095175 published on May 4, 2006. This disclosure describes a comprehensive systems having many important components. In particular, deWaal et al presents a 'crash survivable apparatus' in which information may be processed and recorded for later transmission into related coupled systems. An ability to rate a driver performance based upon data captured is particular feature described is some detail.

Also, inventor Boykin of Mt. Juliet Tenn. presents a "composite mobile digital information system" in U.S. Pat. No. 6,831,556. In these systems, a mobile server capable of transmitting captured information from a vehicle to a second location such as a building is described. In particular, a surveillance system for capturing video, audio, and data information is provided in a vehicle.

Inventors Lao et al, teach in their publication numbered 2005/0099498 of a "Digital Video System-Intelligent Information Management System" which is another application for U.S. patent published May 12, 2005. A digital video information management system for monitoring and managing a system of digital collection devices is specified. A central database receives similar information from a plurality of distributed coupled systems. Those distributed systems may also be subject to reset and update operations via the centralized server.

Finally, "Mobile and Vehicle-Based Digital Video System" is the title of U.S. patent application disclosure publication numbered 2005/0100329 also published on May 12, 2005. It also describes a vehicle based video capture and management system with digital recording devices optimized for field use. Because these systems deploy non-removable media for memory, they are necessarily coupled to data handling systems via various communications links to convey captured data to analysis servers.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of the inventions taught herefollowing.

SUMMARY OF THESE INVENTIONS

Comes now: James Plante; Gregory Mauro; Ramesh Kasavaraju; and Andrew Nickerson, with inventions of systems for interpretation of non-discrete data and further for conversion of the non-discrete data to a discrete dataset representation thereof for use in conjunction with vehicle event recorders. An 'exception event' occurs whenever an extraordinary condition arises during normal use of a motor vehicle. Upon declaration of such exception event, or hereinafter simply 'event', information is captured and recorded at the vehicle—in particular, information relating to vehicle and operator performance and the states of vehicle subsystems and the environments about the vehicle.

Accordingly, systems first presented herein are arranged to capture, record, interpret, and analyze information relating to or arising from vehicle use. In particular, both discrete and non-discrete types of information are captured by various vehicle mounted sensors in response an event having been declared via an event trigger. Non-discrete data is passed to and processed by a discretization facility where it is used to produce an interpreted dataset (discrete) then associated and recombined with original captured data thus forming a complete event dataset which is machine processable. Analysis can therefore be taken up against these complete datasets which include the interpreted data where analysis results are used to drive automated actions in related coupled systems. Accordingly, those actions depend upon: interpreted information processed in the discretization facility; discrete data captured at the vehicle event recorder; and combinations thereof.

An analysis server is provided to run database queries which depend upon both the originally captured discrete data, and interpreted data as both of these are in machine processable form. The analysis server is therefore enabled with greater functionality as its information base is considerably broadened to include that which would not otherwise be readily processable by automated machines. The analysis server is arranged to initiate actions in response to detection of certain conditions in the event database. These may be actions which depend on a single event record, or a plurality of event records. The following examples illustrate this point thoroughly.

A vehicle event recorder having a suitable event trigger captures video and numeric data in response to a detected impact or other impulse force. Numeric information collected by the plurality of vehicle subsystem sensors is insufficient to fully characterize the nature of the event. However, upon review of video and audio information captured by an expert event interpreter, various important aspects of the event can be specified in a discrete way. For example, it can be determined that the impact should be characterized as a "curb strike" type impact where a single front wheel made excessive contact with the roadway edge or other object. The interpreter's decisions are is expressed via a graphical user interface system particularly designed for this purpose. These graphical user interfaces are comprised of control objects which can be set to various values which reflect the nature of the interpretation. As such, the control object value state having been manipulated by an interpreter after reviewing non-discrete data, may be associated with a particular event/event data and stored in a database where it may be read by a machine in an analysis step. For example, in a general daily review of vehicle activity, a computer (analysis server) determines that a curb strike has occurred. Further, the analysis server considers the degree of severity by further analyzing force data and finally determines a maintenance action is necessary and orders a front-end alignment action be performed on the vehicle. The analysis server transmits the order (for example via e-mail) to the fleet maintenance department. Upon the next occasion where the vehicle is in for maintenance, the necessary alignment will be performed in response to receipt of the automated e-mail notice.

In a second illustrative example an analysis server reads a plurality of event records. This time, an action initiated by the analysis server is directed not to a vehicle, but rather to a vehicle operator. This may be the case despite the fact that a single operator may have operated many different vehicles of a vehicle fleet to bring about several event records; each event record having an association with the operator in question. An analysis server may produce a query to identify all of the events which are characterized as "excess idle time" type events associated with any single operator. When a vehicle is left idling for extended periods, the operation efficiency of the vehicle is reduced. Accordingly, fleet managers discourage employee operators from extended idling periods. However, under some conditions, extended idling is warranted. For example where a school bus is loading children in an extremely cold weather, it is necessary to run the engine to generate heat for the bus interior. It is clear that an 'excess idling' type event should only be declared after careful interpretation of non-discrete video data. Discrete data produced by vehicle subsystem detectors may be insufficient to properly declare all excess idling type events. Whenever a single operator has accumulated excess idling events at a rate beyond a predetermined threshold, for example three per month, the analysis server can automatically detect such conditions. Upon detection, the analysis server can take action to order a counseling session between a fleet manager and the operator in question. In this way, automated systems which depend upon interpreted data are useful for managing operations of fleet vehicles.

Vehicle event recorders combine capture of non-discrete information including images audio and other forms of non-discrete or partly discrete data as well as discrete digital or numeric data. Information is passed to a specialized processing station or 'discretization facility' including a unique event record media player arranged to simultaneously playback event data and a graphical user interface arranged with special controls having adjustable value states.

These systems are further coupled to databases which support storage of records having a structure suitable to accommodate event records as described. Specifically, these database records are coupled to the controls of the graphical user interface via control present value states. Finally, these systems are also comprised of analysis servers which interrogate the database to determine when various conditions are met and to initiate actions in response thereto.

OBJECTIVES OF THESE INVENTIONS

It is a primary object of these inventions to provide information processing systems for use with vehicle event recorders.

It is an object of these inventions to provide systems which reduce complex non-discrete data to a discrete form.

It is an object of these inventions to provide advanced analysis on non-discrete data captured in vehicle event recorders.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present invention will become better understood with regard to the following description, appended claims and drawings where:

Figure 3:
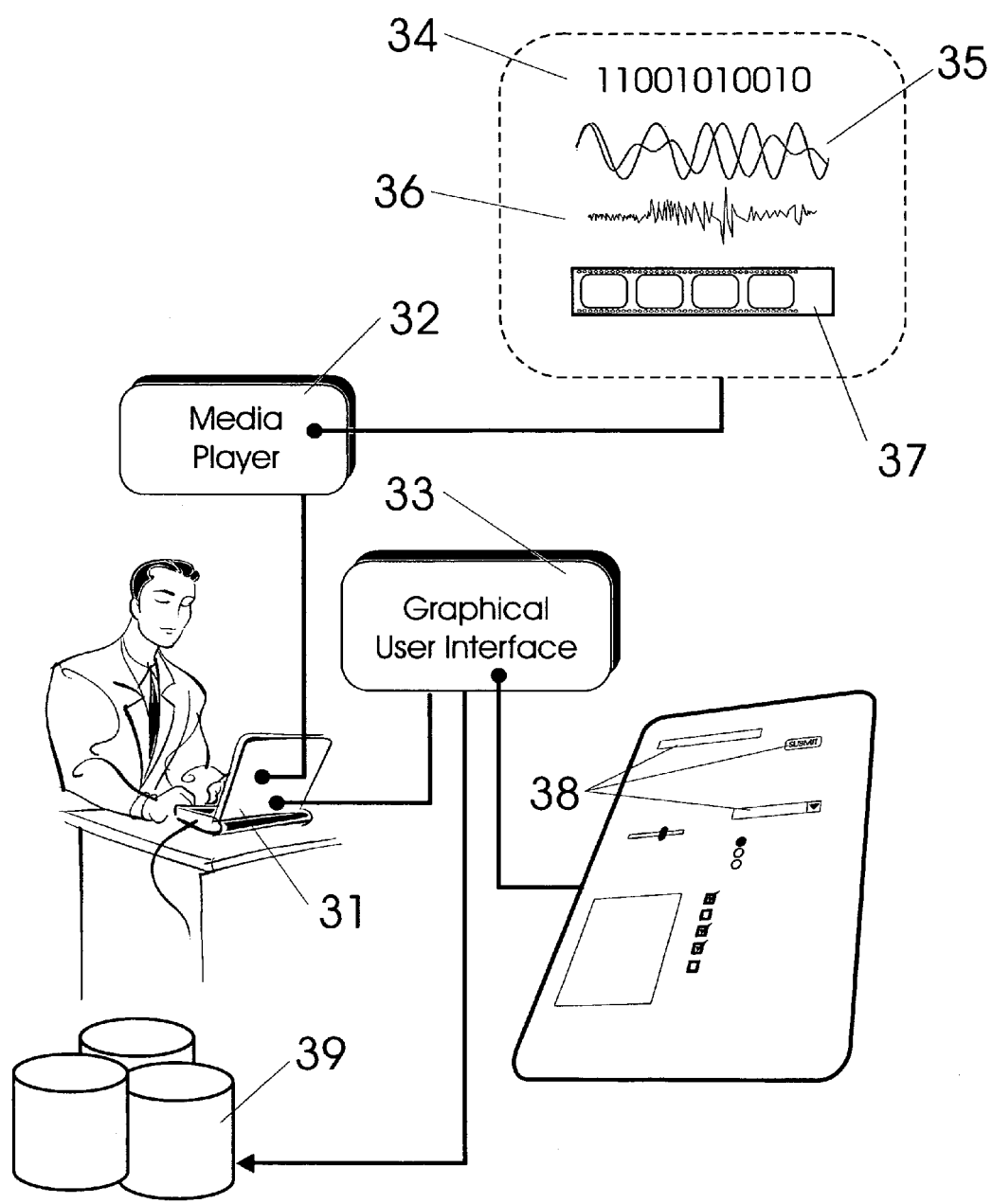
Figure 4:
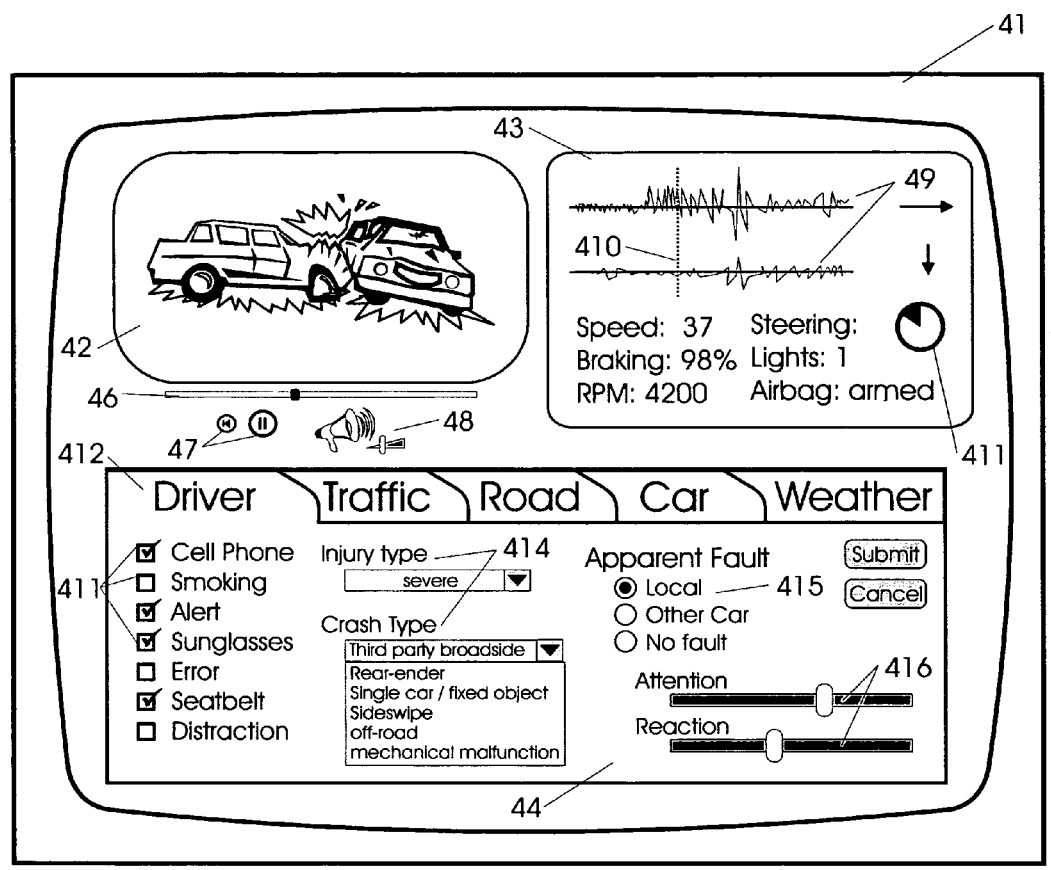
Figure 5:
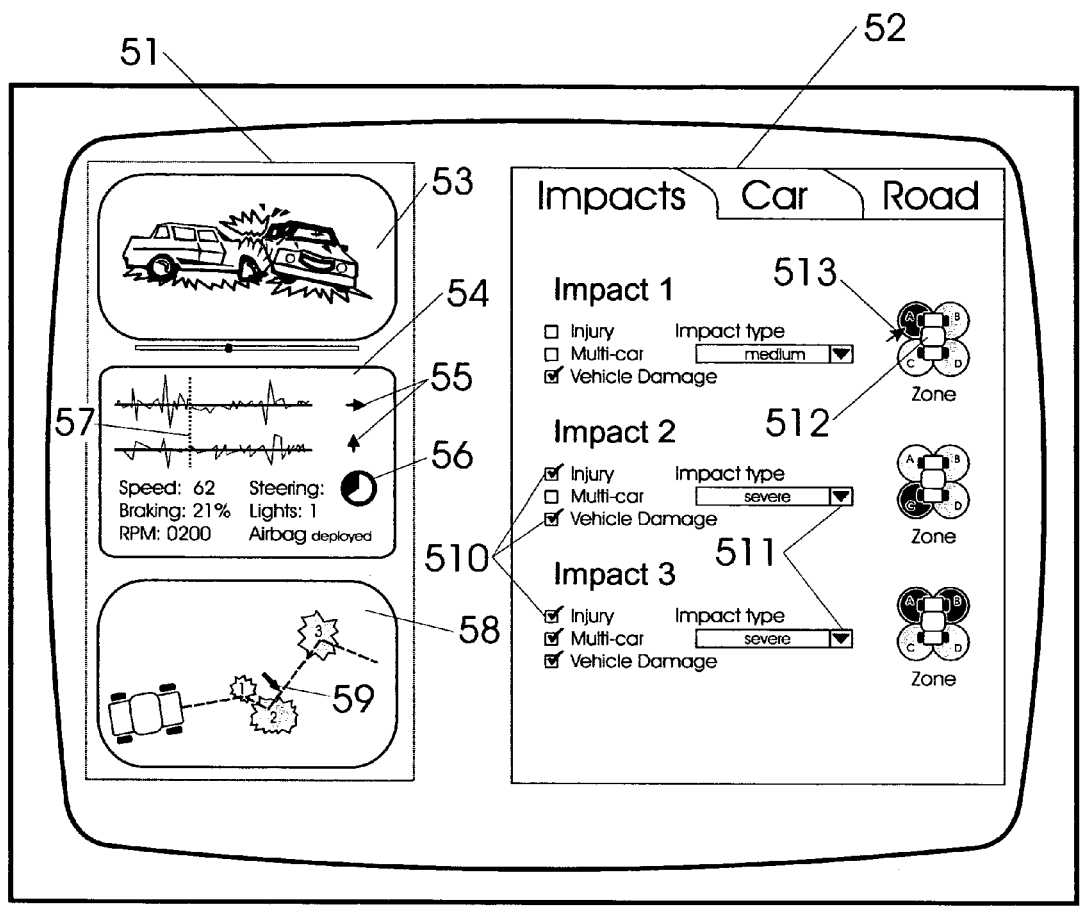
Figure 6:
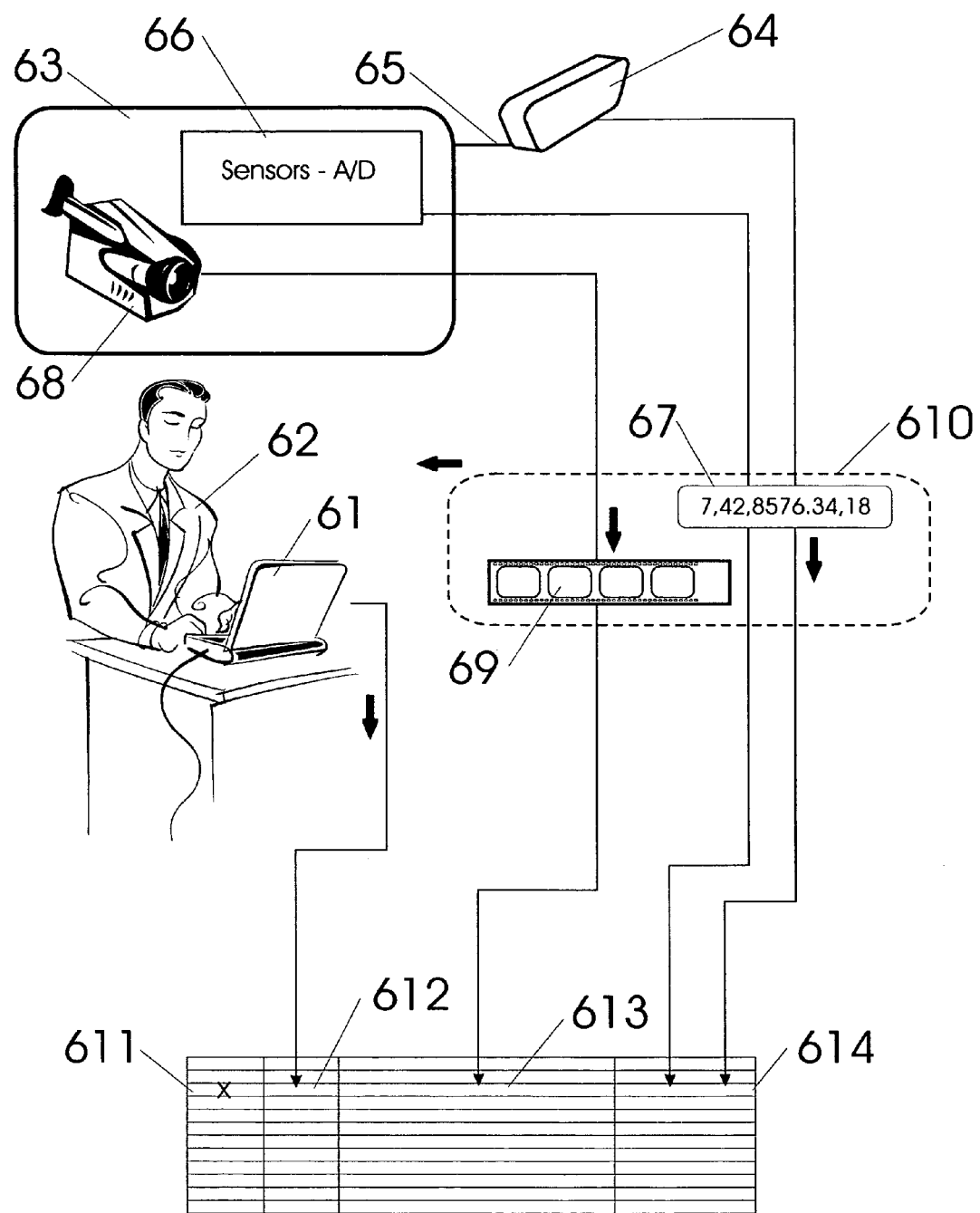
Figure 7:
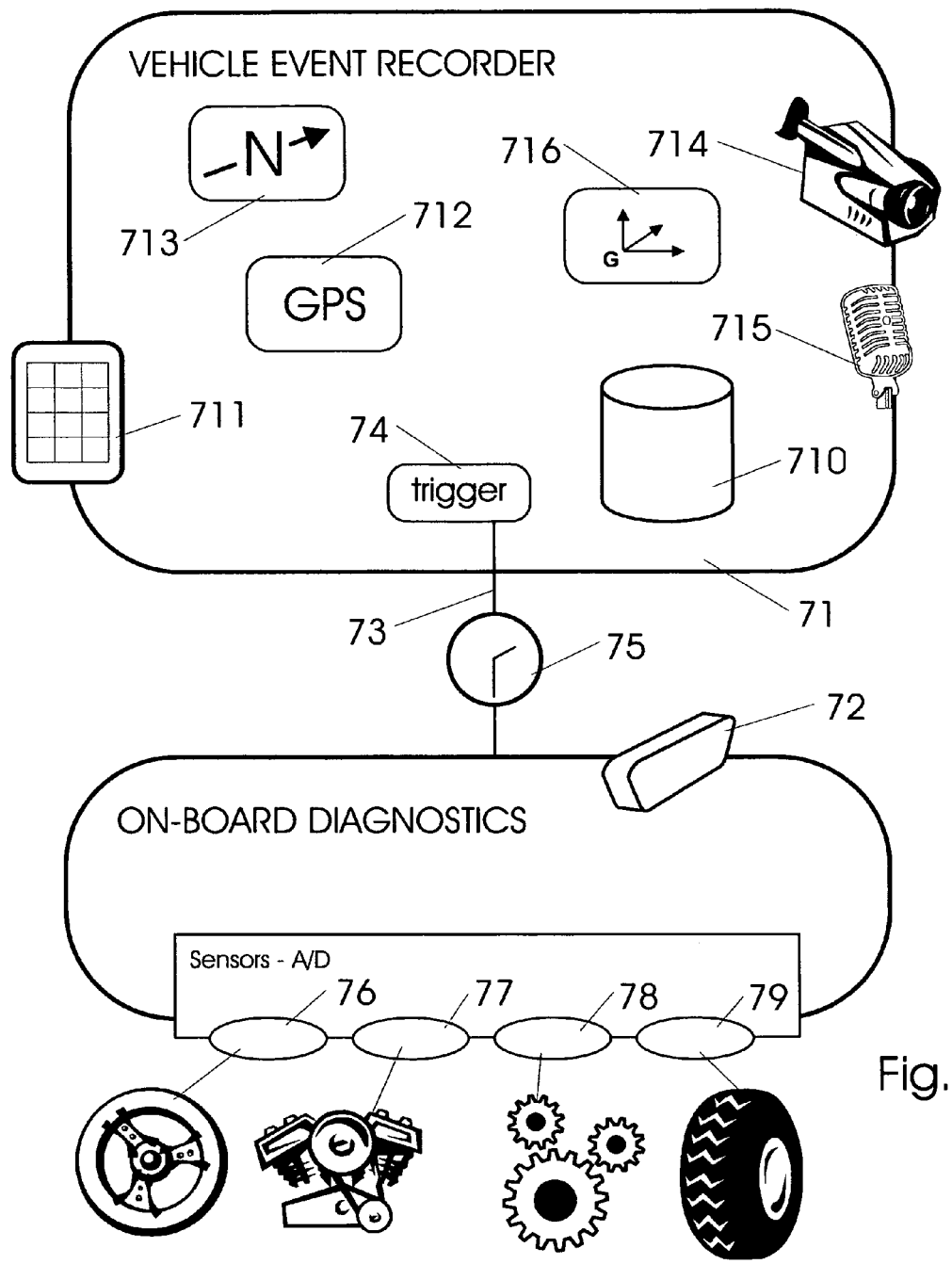
Figure 8:
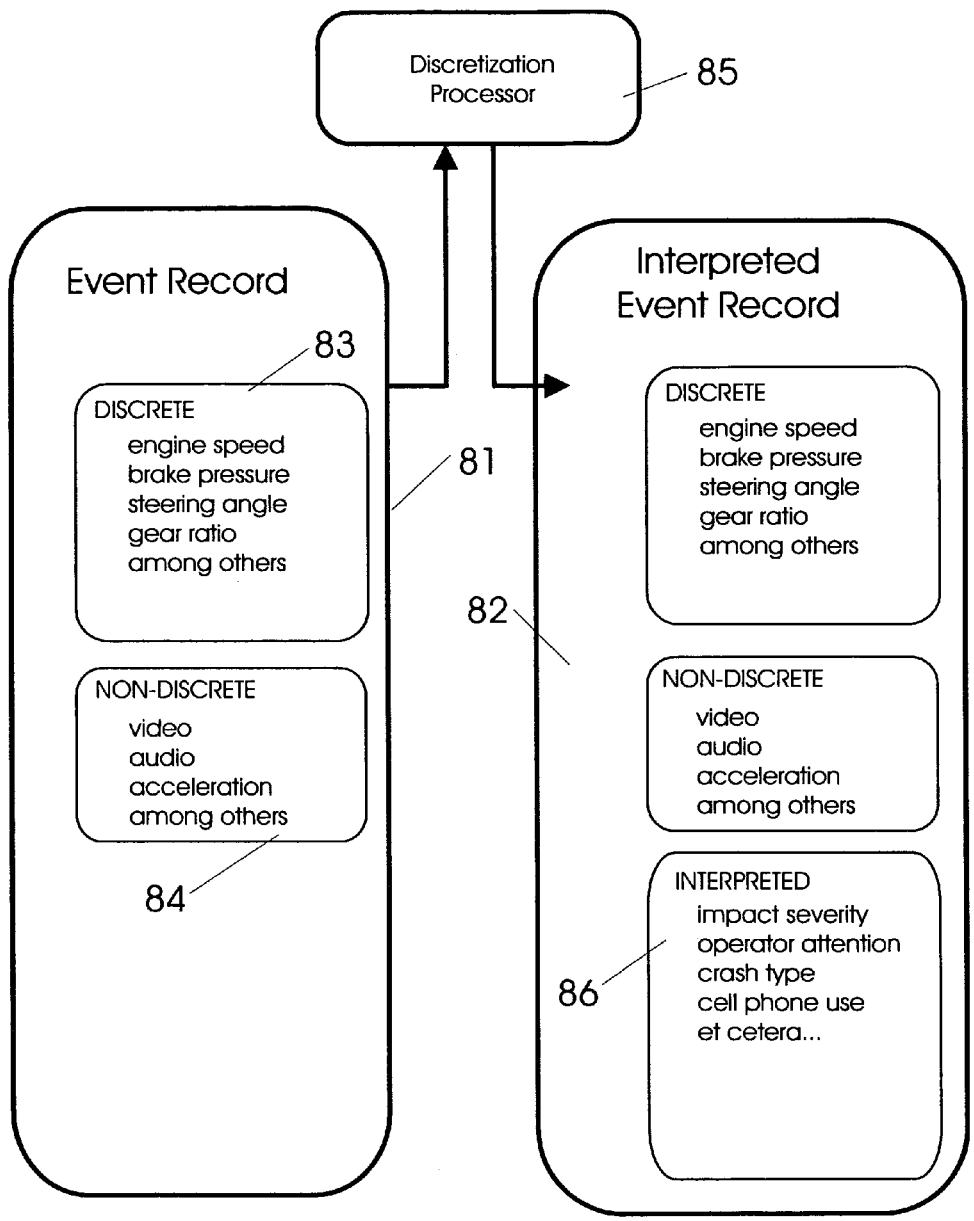
Figure 9:
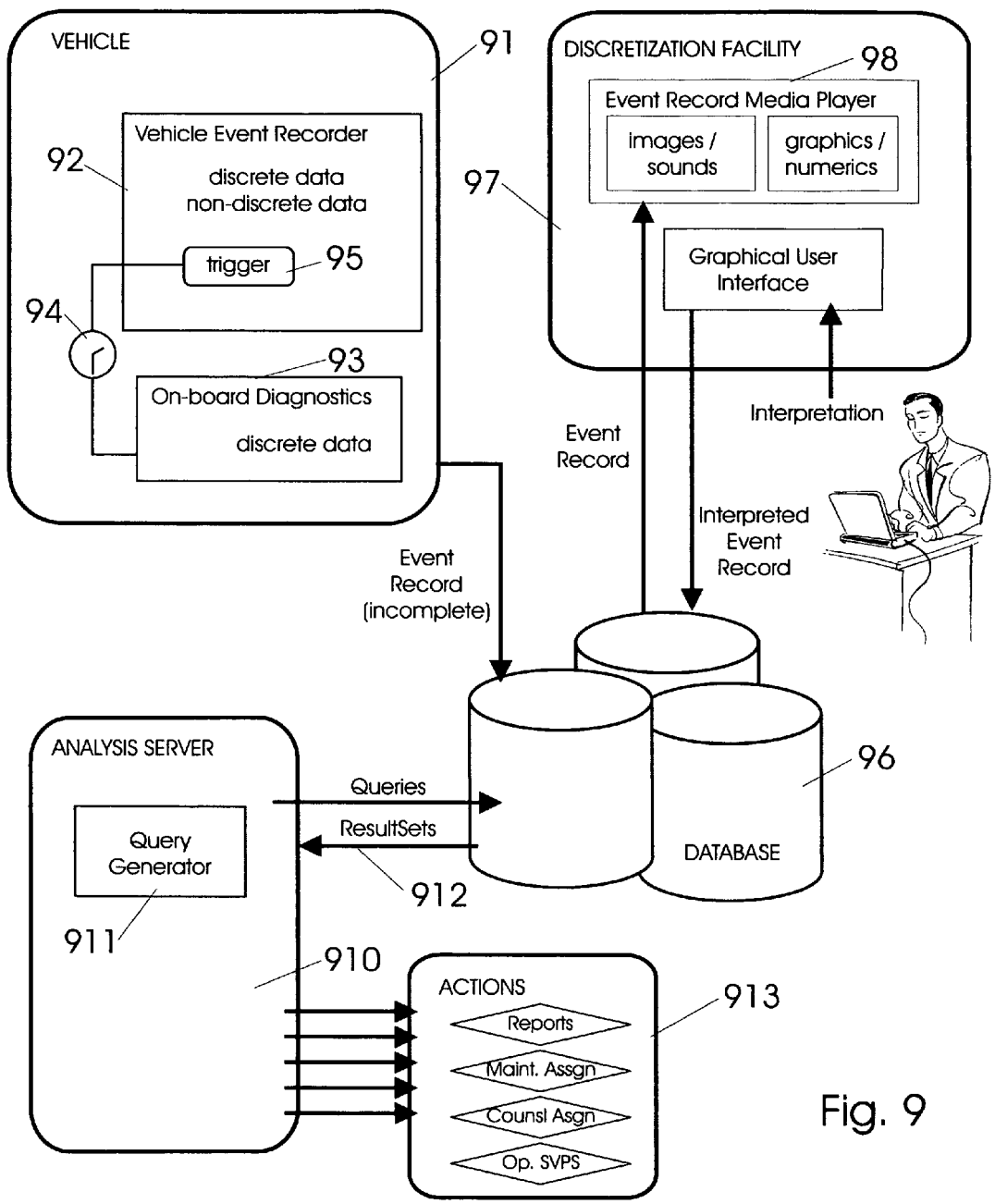

FIG. 3 similarly details these discretization facilities;

FIG. 4 illustrates an example of a display monitor including a graphical user interface couple with a special purpose multi media player;

FIG. 5 suggests an alternative version including special graphical objects;

FIG. 6 illustrates elements of these systems as they relate data types and further to portions of a database record structure;

FIG. 7 is a schematic of a vehicle mounted portion including the various sensors which capture data in an event;

FIG. 8 is a block diagram depicting the structure of an event record contents and their relationships with a discretization facility; and FIG. 9 is a system block diagram overview.

GLOSSARY OF SPECIAL TERMS

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Vehicle Event Recorder

A vehicle event recorder is vehicle mounted apparatus including video recording equipment, audio recording equipment, vehicle system sensors, environmental sensors, microprocessors, application-specific programming, and a communications port, among others. A vehicle event recorder is arranged to capture information and data in response to detection of an abnormal condition or 'exception event'.

Exception Event

An 'exception event' is any occurrence or incident which gives rise to declaration of an 'event' and results in the production of a recorded dataset of information relating to vehicle operator and systems status and performance especially including video images of environments about the vehicle. An exception event is declared via a trigger coupled to either a measured physical parameter which may exceed a prescribed threshold (automatic) or a user who might manipulate a 'panic button' tactile switch (manual).

Non-Discrete Data

While all things in our physical world are quantized and therefore necessarily 'discrete', the reader will appreciate the use of the term 'non-discrete data' as intended here to mean anything less than completely represented via numeric values. For example, while a video stream captured in these systems is absolutely digital and numeric, some information in the video is not contained in the numeric representation of thereof. A clear example is illustrated in a digital photograph of a human face. While every bit is perfectly specified and defined—it may be impossible to determine the identity of person in the photograph merely by considering the bit data. An interpretive step can be performed where the bits are considered in their entirety to determine the photograph is of Ronald Reagan. Upon such interpretation of the image data, one can effect a discrete indicator which represents the identity of the person in the photograph. Thus, even 'digital images' are considered non-discrete for purposes of this disclosure despite their being merely a collection of very well defined numeric set of bits and bytes.

PREFERRED EMBODIMENTS OF THESE INVENTIONS

In accordance with each of preferred embodiments of these inventions including vehicle exception event management systems are provided. It will be appreciated that each of the embodiments described include an apparatus and the apparatus of one preferred embodiment may be different than the apparatus of another embodiment.

Preferred embodiments of these exception event discretization facility arranged for interpreting non-discrete data and providing a corresponding discrete dataset are particularly characterized as including the following elements: a coupling to a vehicle event recorder, an interpretation unit, and a database interface. The coupling between the discretization facility and the vehicle is arranged to transmit data, most particularly the non-discrete data, from an vehicle event recorder to the interpretation unit of the discretization facility where it can be converted into discrete data. A wireless communications link between a highly mobile vehicle system and a stationary computer server is one preferred coupling. The interpretation unit is arranged to review/replay non-discrete portions of the data received from the vehicle event recorder and further to provide a newly formulated discrete dataset in view performed at the discretization facility. Finally, a database interface couples data from the interpretation unit in accordance with a prescribed data structure via an 'insert' action. Members of the so formed discrete dataset that is produced at the interpretation unit are put into prescribed fields of a cooperating database record having a particular structure.

Figure 1:
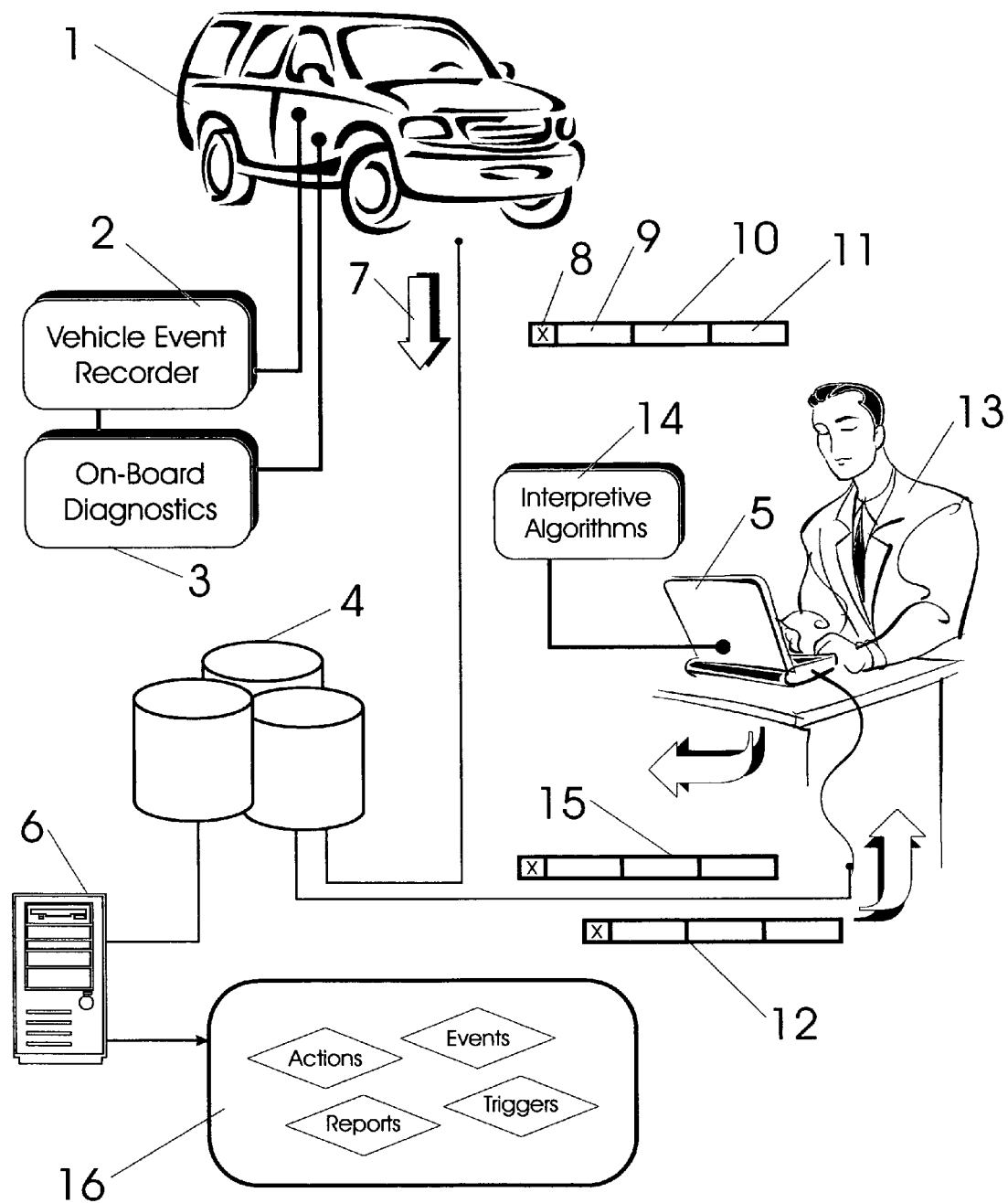
FIG. 1 is schematic drawing of an example exception event management system.

A basic understanding of these systems is realized in view of the drawing figures, in particular the overview illustration of FIG. 1. A common motor vehicle 1 may be provided with systems first presented here. In particular, a vehicle event recorder 2 which includes a video camera, memory, and event trigger such that upon declaration of an exception event, video data relating to the event, more particularly video associated with a period immediately prior to and immediately after an event is recorded to memory for temporary storage. In some versions, an OBD system 3 is also coupled to the event, trigger and memory in a similar fashion whereby data captured in these same periods by the OBD is stored to a memory for further processing.

After a session of normal vehicle use, or 'service period', the vehicle is coupled to a computer network such that data captured and stored in temporary on-board memory can be transferred further into the system components such as a database 4, discretization facility 5, and analysis server 6. In preferred versions, the vehicle may be connected to a system network merely by returning to a predetermined parking facility. There, a data communications link or data coupling between the vehicle mounted vehicle event recorder and a local wireless access point permits data associated with various events which occurred since last download to be downloaded 7 to the system database.

At this stage, a single event data record is allocated for each new event data set and each data record is assigned a unique identifier 8 sometimes known as a primary key. As such, there exists a one-to-one correspondence between events and event data records stored in the database. While an event data record may be comprised of both non-discrete data 9 including video image series; an analog audio recordings; acceleration measurements, for example, and discrete data 10 such as binary indication of headlights on/off; numeric speed values; steering angle indicators; gear ratio indicators, among others, et cetera, the event data record is not complete, or 'preliminary', at this stage. An interpreted portion 11 of the event record remains allocated but empty at this stage. Until a discretization step is taken up at a discretization facility and data is reviewed, analyzed and interpreted to formulate the interpreted data portion, and then added to the event data record, the event data record is only partially complete.

An event data record 12 is passed to a discretization facility. The discretization facility operates to receive data from the vehicle event recorder, analyze and/or replay the received data, and facilitate an interpretation of non-discrete data contained in the event data record, formulate a corresponding discrete dataset, and finally, convey that newly formed discrete data into a database having prescribed data structure whereby it is connected and associated with the event from which is came. In some versions, non-discrete data is processed by advanced computer processes capable of interpretation by applying interpretive algorithms. In other versions, a human interpreter intervenes to read certain non-discrete data at a proprietary media player and convert it at a graphical user interface into representative discrete values processable via a machine. In still other versions, both machine and human discretization processes are employed.

Machine processes may be illustrated as interpretation algorithms 14 are applied to video data. Video images subject to image processing/recognition routines, artificial intelligence applications, and 'fuzzy logic' algorithms may specifically "recognize" particular patterns can produce discrete outputs as interpretations of those non-discrete inputs. In example, the moment of impact is readily discoverable as a frame-to-frame image tends to greatly change at the moment of impact. Thus, some motion detection routines will be suitable for deciphering the precise moment of impact. Another useful illustrative example includes interpretation of traffic light signals. Image analysis can be applied such that it is determined precisely which traffic light color was indicated as the vehicle approaches an intersection. In even more advanced schemes, the traffic light changes may be automatically quantified by image analysis whereby it can be shown approximately how much time has passed between a light change and an impact. These and other fully automated image processing modules may be implemented as part of a discretization facility which reads non-discrete image data and produces discrete numeric outputs. Of course, an endless number of image recognition algorithms may be arranged to produce discrete output from image interpretation. It is not useful to attempt to enumerate them here and it is not the purpose of this teaching to present new image processing routines. On the other hand, it is the purpose of this disclosure to present new relationships between the vehicle event recorders and the systems which process, store and use data collected thereby and those relationships are detailed here. It is not only video data which might be subject to processing by interpretation modules, but also, audio data and any other non-discrete data captured by a vehicle event recorder.

Audio data may be processed by discretization algorithms configured to recognize the screech of skidding tires and the crushing of glass and metal. In this case, discretization of audio data may yield a numeric estimation for speed, time of extreme breaking, and moment of impact, et cetera. Again, it is not useful to present detail as to any particular recognition scheme as many can be envisioned by a qualified engineers without deviation from the scope of the systems presented here. In addition to video and audio types of non-discrete data, acceleration data captured as an analog or not discrete signal may be similarly processed. Mathematical integration applied to acceleration data yields a velocity and position values for any moment of time in the event period.

Besides, and in parallel with automated means for interpretive reading of non-discrete data, these discretization facilities also include means for manual interpretive reading of non-discrete data. In some cases, there can be no substitute for the human brain which has a very high interpretive capacity. Accordingly, discretization facilities of these inventions also provides a system which permits a human interpreter to review non-discrete information of an event record, interpret its meaning, and to effect and bring about discrete machine representations thereof. Specifically, a special proprietary media player arranged with particular view to presenting data captured by these vehicle event recorder systems in a dynamic graphical/image presentation over a prescribed timeline. Further, these manual interpretive systems also include simultaneous display of a custom graphical user interface which includes devices for discrete data entry. Such devices or graphical user interface "controls" each are associated with a particular attribute relating to an event/driver/vehicle/environments and each have a range of discrete values as well as a present state value. By reviewing data via the discretization facility media player and manipulating the graphical user interface, a human interpreter generates interpreted data which is discrete in nature. Thus, both automated and manual systems may be used at a discretization facility to produce discrete data from review and interpretation of non-discrete information. The discretization facility output, the interpreted data is then combined with the preliminary event record to form a complete event record 15 and returned to the database for further processing/analysis.

Event records which are complete with discrete, non-discrete, and interpreted data may be interrogated by database queries which depend upon either or all of these data types or combinations of either of them. In systems which do not provide for discretization of non-discrete data, it is impossible to run effective machine based analysis as the processable information is quite limited.

Analysis of so prepared complete event records comprising discrete data, non-discrete data, and interpreted data may be performed to drive automated systems/actions 16 including: maintenance actions (wheel re-alignments in response to impacts characterized as 'curb strike' type collisions for example); occurrence of prescribed events (operator service exceeds 10,000 hours without accidents); triggers (driver violations requires scheduling of counseling meeting); weekly performance reports on drivers/vehicles, among others. Some of these actions are further detailed in sections herefollowing. For the point being made here, it is sufficient to say automated systems are tied to event data which was previously subject to a discretization operation. Analysis servers may run periodic analysis on event data or may run 'on-demand' type analysis in response to custom requests formulated by an administrator. In this way, these systems provide for advanced analysis to be executed on detailed event records which include in-part discretized or interpreted data. Data captured during vehicle use is stored and processed in a manner to yield the highest possible machine access for advanced analysis which enables and initiates a highly useful responses.

Figure 2:
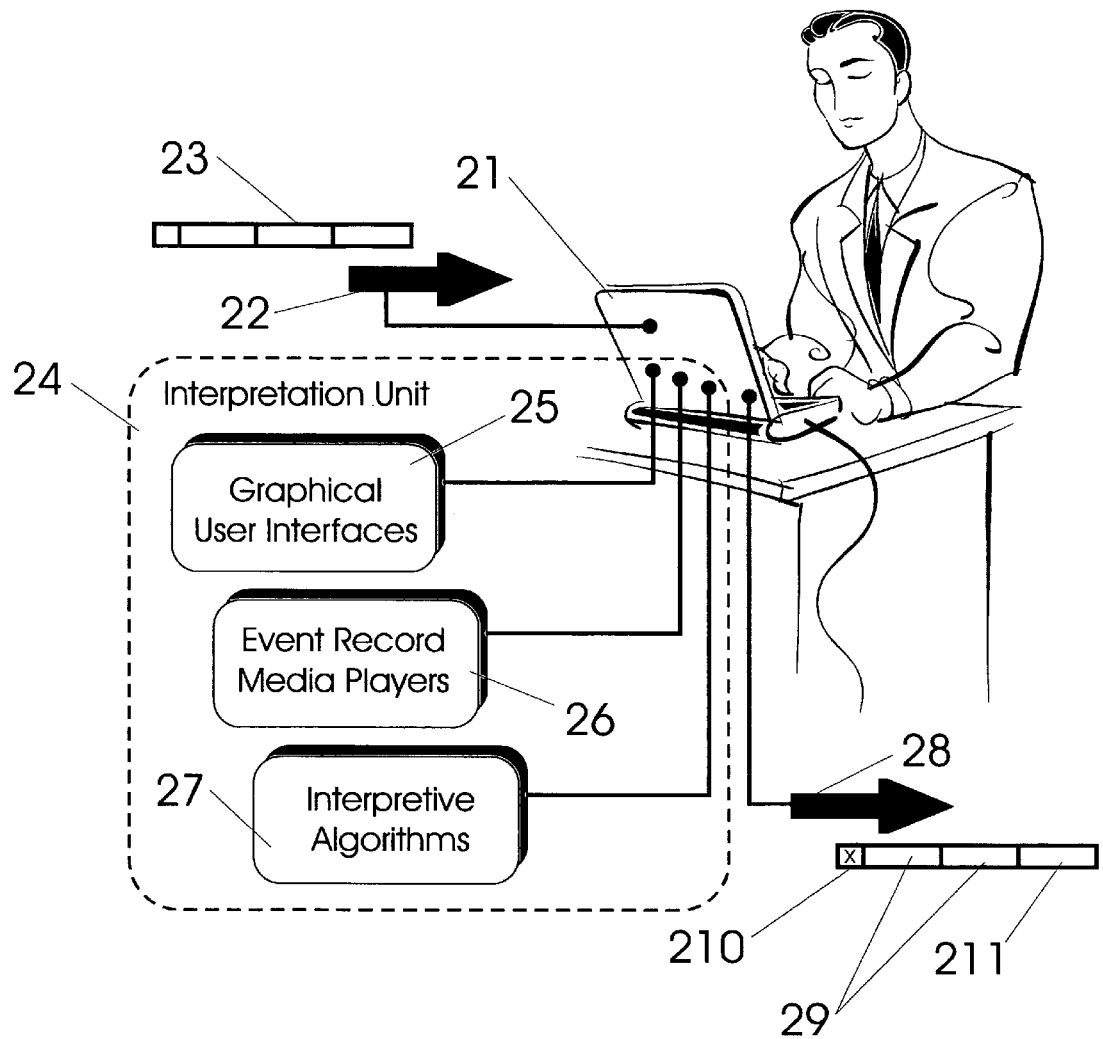
FIG. 2 illustrates in further detail a discretization portion of these systems.

FIGS. 2 and 3 illustrate an example of a discretization facility 21 in isolation and better detail. A discretization facility may be arranged as a node of a computer network in communication with vehicle event recorders and system databases. In particular, a discretization facility 21 may be in communication with a vehicle event recorder whereby it receives data captured there. This data includes that which may be characterized as discrete such as digital and numeric data as well as data which is non-discrete such as image, audio, and force data. A coupling 22 is provided to transmit data 23 from a mobile vehicle event recorder to the discretization facility and further into the interpretation unit 24 thereof. The data graphic in the figure illustrates a dataset from the vehicle event recorder with discrete and non-discrete data, but without index or key assignment, and further without interpreted data (i.e. represented as an empty cell). An interpretation unit may include: graphical user interfaces 25, an event record media players 26, and interpretive algorithms 27. Database interface 28 is particularly provided to adopt the controls of the graphical user interface to cooperate with the data structures of the database. That is, each control which has a present value is coupled to a field of a data record which corresponds appropriately to the data type of the control. The interface permits the state of the controls at any given time to be 'locked' or captured and inserted into the database at a particular record. The graphic which represents the event dataset at this point include data 29 (both discrete and non-discrete) captured at the vehicle event recorder, an index or key 210 to distinguish the event from all other events, and finally the newly formed interpreted data (also discrete) 211 as produced by the interpretation unit.

This process is further illustrated in FIG. 3 which shows media player data inputs as well as an example of a graphical user interface. A discretization facility 31 is embodied as major elements including event record media player 32 and custom graphical user interface 33. Data produced by a vehicle event recorder and an on-board diagnostics system is received at the discretization facility and this data arrives in a format and structure specifically designed for these systems. Specifically, a timeline which synchronously couples video data and OBD data assures a display/viewing for accurate interpretation. This is partly due to the specific nature of the data to be presented. Common media player standards do not support playing of certain forms of data which may be collected by a vehicle event recorder and on-board diagnostics systems, for example Windows™ Media Player cannot be used in conjunction with data captured in a motor vehicle; Windows™ Media Player takes no account of data related to speed, acceleration, steering wheel orientation, et cetera. In contrast, data specific to these exception event recording systems include: digital and numeric data 34 formed by sensors coupled to vehicle subsystems, as well as more conventional audio data 35 recorded at an audio transducer. These may include operator compartment microphones as well as microphones arranged to receive and record sounds from the vehicle exterior. Acceleration data 36, i.e. the second derivative of position with respect to time, may be presented as continuous or non-discrete data subject to interpretation. Video data 37 captured as a series of instantaneous frames separated in time captures the view of environments about the vehicle including exterior views especially forward views of traffic and interior views, especially views of a vehicle operator. Each of these types of data may be subject to some level of interpretation to extract vital information.

Some examples are illustrated as follows. Some vehicle collision type events include complex multiple impacts. These multiple impacts might be well fixed objects like trees and road signs or may be other vehicles. In any case, a microphone which captures sounds from a vehicle exterior may produce an audio recording which upon careful review and interpretation might contribute to a detailed timeline as to various impacts which occur in the series. Numeric data which indicates an operators actions such as an impulse braking action, swerve type extreme steering action, et cetera, may be considered in conjunction with an event record timeline to indicate operator attention/inattention and other related response factors. Accelerometer data can be used to indicate an effective braking action, for example. Acceleration data also gives information with respect to a series of impacts which might accompany an accident. Acceleration data associated with orthogonal reference directions can be interpreted to indicate resulting direction of travel collisions. Mathematical integration of acceleration data provides precise position and velocity information as well. Video images can be played back frame-by-frame in slow motion to detect conditions not readily otherwise measured by subsystem sensors. It human reviewer particularly effective at determining the presence certain factors in an event scene. As such, media players of these systems are particularly arranged to receive this data as described and to present it in a logical manner so a human reviewer can easily view or "read" the data. While viewing an event playback, an interpreter is also provided with a special graphical user interface which permits easy quantification and specification to reflect various attributes which may be observed or interpreted in the playback. A human operator may manipulate graphical user interface controls 38 to set their present state values. These controls and each of them have a range of values and a present state value. The present state value is adjusted by an operator to any value within the applicable range. The present state value of each control is coupled to the database via appropriate programming such that the database will preserver the present state value of the control and transfer it as part of an event record stored in long term memory.

An example of graphical user interfaces effected in conjunction with event record type media players is illustrated further in FIG. 4 which together fill an image field 41, for example that of a computer workstation monitor. The first portion of the image field may be arranged as an event video player 42. Video images captured by a vehicle event recorder may be replayed at the player to provide a detailed visual depiction of the event scene. A video series, necessarily having an associated timeline, may be replayed on these players in several modes including either: fast forward, rewind, slow motion, or in actual or 'real-time' speed, among others as is conventional in video playback systems. A second portion, a graphical display field 43 of the display field may be arranged to present graphical and numeric information. This data is sometimes dependent upon time and can be presented in a manner whereby it changes in time with synchronization to the displayed video images. For example, a binary indication of the lights status may be presented as "ON" or "1" at the first video frame, but indicated as being "off" or "0" just after a collision where the lights are damaged and no longer drawing current as detected by appropriate sensors. Another area of the display field includes a graphical user interface 44. A "tab strip" type graphical user interface control is particularly useful in some versions of these systems. Graphical user interface controls may be grouped into logically related collections and presented separately on a common tab. A timeline control 46 permits an interpreter to advance and to recede the instant time at will by sliding a pip along the line. "Start" and "stop" playback controls 47 can be used to freeze a frame or to initiate normal play. Similarly, controls may additionally include fast forward, rewind, loop, et cetera. Control interface 48 to adjust audio playback (volume) are also part of these media players. It is important to note that the graphical presentations of display field 43 are strictly coupled to the video with respect to time such that frame-by-frame, data represented there indicates that which was captured at the same incident a video frame was captured. Sometimes information presented is represented for the entire event period. For example, it is best to show force data 49 for the entire event period. In this case, a "present instant" reference line 410 is used to indicate the moment which corresponds with the video frame capture. It is easy to see that conventional media players found in the art are wholly unsuitable for use in these systems. Those media players do not account for presentation of event data with synchronization to a video timeline. For example the graphical representation of instantaneous steering wheel orientation angle 411, instantaneous speed. Media players of the art are suitable for display of video simultaneously with a data element such as air temperature area air temperature does not appreciably change in time so there exists no synchronization with the video frames. However, when presented data is collected via sensors coupled to a vehicle subsystems and is synchronized with the video, the media player is characterized as an event record media player ERMP and constitutes a proprietary media player. Further, this specialized media player is an exceptionally good tool for reading and presenting an event intuitively and in detail as it provides a broad information base from which detailed and accurate interpretations may be easily made. While a few interesting and illustrative examples of data types are presented in the data display field, it should be appreciated that a great many other types not shown here are examples may also be included in advanced systems. As it is necessary for a clear disclosure to keep the drawing easily understandable, no attempt is made to show all possible data factors which might be presented in a data display field of these systems. Indeed there may be many hundreds of parameters captured at the vehicle during an event which might be nicely displayed in conjunction with a frame-by-frame video of the event. One should realize that each particular parameter may contribute to a valuable understanding of the event but that it is not mentioned here is no indication of its level of importance. What is important and taught here, is the notion that a better interpretive platform is realized when any time dependent parameter is played back in a pleaded display field in conjunction with the video where synchronization between the two is effected.

The ERMP, so defined in the paragraphs immediately prior, is preferably presented at the same time with graphical user interface 44. Graphical user interfaces are sometimes preferably arranged as a tab strip. For example, a "Driver" tab 412 may have controls associated therewith which relate specifically to driver characterizations. Various graphical user interface control element types are useful in implementations of these graphical user interface systems; checkboxes 413, dropdown listboxes 414, radio buttons 415, sliders 416, command buttons, et cetera, among others. Checkboxes may be used indicate binary conditions such as whether or not a driver is using a cell phone, is smoking, is alert, wearing sunglasses, made error, is using a seat belt properly, is distracted, for example. It is easily appreciated that these are merely illustrative examples, one would certainly devise many alternative and equally interesting characterizations associated with a driver and driver performance in fully qualified systems. Again these are provided merely for illustration of graphical user interface controls.

One will easily see however, their full value in consideration of the following. To arrange a physical detector which determines whether or not a driver is wearing sunglasses is a difficult task indeed; possible but very difficult. Conversely, in view of these systems which permit discretization of such driver characteristics including the state of her sunglasses, that is these systems which arrive at a discrete and thus computer processable expression of this condition, the detailed nature of an event is realized quite readily. By a simple review of an event video, an interpreter can make the determination that a driver is wearing sunglasses and indicate such by ticking an appropriate checkbox. As the checkbox, and more precisely it present state value, is coupled to the specific event record, information is passed to and stored in the database and becomes processable by computer algorithms. Previously known systems do not accommodate such machine processable accounts various information usually left in a non-discrete form if captured at all. A fleet manager can thereafter form the query: "what is the ratio of noon hour accident type events where drivers were wearing sunglasses versus these with drivers not wearing sunglasses". Without systems first presented here, such information would not available without an extremely exhaustive labor intensive examination of multiple videos.

Of course, these systems are equally useful for information which is not binary, yet still discrete. A listbox type control may provide a group having a discrete number of distinct members. For example a "crash type" list box containing five elements ('values') each associated with a different type of crash may be provided where a reviewer's interpretation could be expressed accordingly. For example, a "sideswiped" crash could be declared after careful review of the media player data and so indicated in the drop-down listbox member associated with that crash type. Of course, it is easy to appreciate the difficulty of equipping a car with electronic sensors necessary to distinguish between a "sideswipe" type crash and a "rear-ender" crash. Thus, a considerable amount of information collected by a video event recorder is non-discrete and not processable by automated analysis until it has been reduced to a discrete form in these discretization facilities. These systems are ideal for converting non-discrete information into processable discrete (interpreted) the dataset to be connected with the event record in an electronic database and data structure coupled to the controls of the graphical user interface. Analysis executed on such complete event records which include interpreted data can be preformed to trigger dependent actions.

Another useful combination version of an event record media player 51 and custom graphical user interface 52 is illustrated in FIG. 5. In this version, an ERMP includes three fields coupled together via an event timeline. An image field 53 is a first field arranged to show video and image data captured via any of the various cameras of a vehicle event recorder. A numeric or graphical field 54 is arranged to represent non-image data captured at a vehicle event recorder during an event. Some presentations of this data may be made in a graphical form such as arrow indicators 55 to indicate acceleration direction and magnitude; the wheel graphical icon 56 to indicate the steering wheel orientation angle. Presenting some numeric data in graphical form may aid interpreters to visualize a situation better; it is easy to appreciate the wheel icon expresses in a far more intuitive way than a mere numeric value such as "117°". "Present instant" indicator 57 moves in agreement (synchronously) with the event timeline and consequently the displayed image frame. In this way, the ERMP couples video images of an event record with numeric data of the same event. Another graphical field 58, an icon driven image display indicates a computed path of a vehicle during an event and further illustrates various collisions as well as the severity (indicated by size of star balloon) associated with those collisions. The graphic additionally includes a "present instant" indication 59 and is thereby similarly coupled to the video and more precisely the event timeline common to all three display fields of the ERMP. This graphic aids an interpreter in understanding of the event scenario details with particular regard to events having a plurality of impacts.

In response to viewing this ERMP, an interpreter can manipulate the graphical user interface provided with specific controls associated with the various impacts which may occur in a single event. For illustration, three impacts are included in the example represented. Impact 1 and 2 coming close together in time, impact 1 being less severe than impact 2, impact 3 severe in intensity, coming sometime after impact 2. By ticking appropriate checkboxes, an interpreter specifies the details of the event as determined from review of information presented in the ERMP. By using drop-down list boxes 511, the interpreter specifies the intensity of the various impacts. Special custom graphical control 512, a nonstandard graphical user interface control graphically presents a vehicle and four quadrants A, B, C, D, where an interpreter can indicate via mouse clicks 513 the portion of the vehicle in which the various impacts occur. In this way, graphical user interface 52 is used in conjunction with ERMP 51 to read and interpret both non-discrete and discrete data captured by a vehicle event recorder and to provide for discretization of those interpretations by graphical user interface controls each dedicated to various descriptors which further specify the accident. Experts will appreciate that a great plurality of controls designed to specify event details will finally come to produce the most useful systems; it is not the purpose of this description to present each of those controls which may be possible. Rather, this teaching is directed to the novel relationships between unique ERMPs and graphical user interfaces and further, discretization facilities in combination with a vehicle mounted vehicle event recorders and database and analysis systems coupled therewith.

FIG. 6 illustrates further relationships between data source subsystems and data record structure. In particular, those operable for capture of data both non-discrete and discrete in nature, and those subsystems operable for converting captured non-discrete data to discrete data.

Attention is drawn to discretization facility 61 which may include image processing modules such as pattern recognition systems. In addition, these discretization facilities include a combination of specialized event record media player as well as custom graphical user interface. Alternatively, a human operator 62 may view image/audio/numeric and graphical data to interpret the event details and enter results via manipulation of graphical user interface controls. In either case, the discretization facility produces an output of machine processable discrete data related to the non-discrete input received there.

Event data is captured and recorded at a vehicle event recorder 63 coupled to a vehicle subsystems, and vehicle operating environments. In some preferred versions, an on-board diagnostics system 64 is coupled 65 to the vehicle event recorder such that the vehicle event recorder trigger operates to define an event. An on-board diagnostics system usually presents data continuously, however, in these event driven systems, on-board diagnostics data is only captured for a period associated with an event declaration. As described herein the vehicle event recorder produces both numeric/digital data as well as non-discrete data such as video and audio streams. Specifically, transducers 66 coupled to vehicle subsystems, and analog to digital converters, A/D, produce a discrete data 67. Some of this discrete data comes from the on-board diagnostics system and some comes from subsystems independent of on-board diagnostic systems. Further, a video camera 68 produces video image series or non-discrete data 69. A copy 610 of these data, including both discrete and non-discrete, is received at the discretization facility for interpretation either by a computer interpretive algorithms or by operator driven schemes. All data, however so created, is assembled together and associated as a single unit or event record in a database structure which includes a unique identifier or "primary key" 611. Interpreted data 612 output from the discretization facility (i.e. the value of graphical user interface controls) is included as one portion of the complete event record; a second portion is the non-discrete data 513 captured by the vehicle event recorder; and a third portion of the event record is the discrete data 514 captured in the vehicle event recorder and not created as a result of an interpretive system.

It is useful to have a closer look at vehicle mounted subsystems and their relationship with the vehicle event recorder and the on-board diagnostics systems. FIG. 7 illustrates a vehicle event recorder 71 and an on-board diagnostics system 72 and coupling 73 therebetween. Since an event is declared by a trigger 74 of the vehicle event recorder, it is desirable when capturing data from the on-board diagnostics system that the data be received and time stamped or otherwise synchronized with a system clock 75. In this way, data from the on-board diagnostics system can be properly played back with accurate correspondence between the on-board diagnostics system data and the video images which each have an instant in time associated therewith. Without this timestamp, it is impossible to synchronize data from the on-board diagnostics system with data from the vehicle event recorder. An on-board diagnostics system may include transducers coupled to vehicle subsystems, for example the steering system 76; engine 77 (such as an oil pressure sensor or engine speed sensors); the transmission 78 (gear ratio) and brakes system 79, among others. Today, standard on-board diagnostics systems make available diagnostic data from a great plurality of vehicle subsystems. Each of such sensors can be used to collect data during an event and that data may be preserved at a memory 710 as part of an event record by the vehicle event recorder. The vehicle event recorder also may comprise sensors independent of the on-board diagnostics system also which capture numeric and digital data during declared events. A keypad 711 is illustrative. A keypad permits a vehicle operator to be associated with a system via a "login" as the operator for an assigned use period. A global positioning system receiver 712 and electronic compass 713 similarly may be implemented as part of a vehicle event recorder, each taking discrete measurements which can be used to characterize an event. In addition to systems which capture discrete data, a vehicle event recorder also may include systems which capture data in a non-discrete form. Video camera 714, microphone 715, and accelerometers set 716 each may be used to provide data useful in interpretive systems which operate to produce discrete data therefrom. While several of each type of data collection system is mentioned here, this is not intended to be an exhaustive list. It will be appreciated that a vehicle event recorder may include many additional discrete and non-discrete data capture subsystems. It is important to understand by this teaching, that both discrete and non-discrete data are captured at a vehicle event recorder and that discrete data may be captured at an on-board diagnostics system and these data capture operations are time stamped or otherwise coupled in time to effect a synchronization between the two.

FIG. 8 illustrates the relationship between a preliminary event record 81 as taken by on-board hardware in comparison to a complete event record 82 which includes an interpreted data portion having discrete, computer processable data therein. In this way, advanced algorithms may be run against the complete event record to more effectively control and produce appropriate fleet management actions.

An event record produced by vehicle mounted systems includes both a discrete data portion 83 and a non-discrete data portion 84. Data associated with a particular declared event is captured and sent to a discretization facility 85 for processing. At the discretization facility, non-discrete data is read either by humans or machines in interpretive based systems and an interpreted data portion 86 is produced and amended to the original event record to arrive at a complete event record.

Finally FIG. 9 presents in block diagram a system review. Primary system elements mounted in a motor vehicle 91 include a vehicle event recorder 92 and optionally an on-board diagnostics system 93. These may be linked together by a system clock 94 and a vehicle event recorder event trigger 95. Together, these systems operate to capture data which may be characterized as discrete and that which is characterized as non-discrete, the data relating to a declared event and further to pass that capture data to a database 96. A discretization facility 97 is comprised of an event record media player 98 where data may be presented visually in a time managed system. A discretization facility further includes a graphical user interface 99 which a system operator may manipulate to effect changes to a present value state of a plurality of controls each having a value range. These control values are coupled to the database and more specifically to the data record associated with an event being played at the media player such that the data record thereafter includes these control values which reflect interpretations from the discretization facility. An analysis server 910 includes query generator 911 which operates to run queries against event data stored in the database, the queries at least partly depending on the interpreted data stored as part of complete event record. Result sets 912 returned from the database can be used in analysis systems as thresholds which trigger actions 913 to be taken up in external systems. For example upon meeting some predefined conditions, special reports 914 may be generated and transmitted to interested parties. In other systems, vehicle maintenance scheduling/operations may be driven by results produced partly based upon interpreted data in the complete event record.

In general, a discretization facility for converting non-discrete data into discrete data may be said to include the following elements: a coupling to a vehicle event recorder, an interpretation unit, and a database interface. The coupling to the vehicle event recorder is provided to convey data captured in an exception event to the interpretation unit of the discretization facility. Data is captured in a vehicle and passed to the discretization facility by way of the coupling. It may be preferably implemented as a wireless communications link between a vehicle system and a stationary computer server. Thus, the coupling is a data conduit between a fixed computer installation and a mobile computing system mounted in a motor vehicle. The interpretation unit is arranged to review non-discrete portions of the data captured in an exception event and further to provide a discrete dataset in view of an interpretation of the non-discrete data. A database interface couples data into a prescribed data structure via an 'insert' action such that members of the discrete dataset produced at the interpretation facility are put into prescribed fields of a cooperating database record.

A discretization facility may be deployed as a computer (machine) system which converts non-discrete inputs into discrete outputs. This may be achieved via various strategies including at least: those characterized as 'fuzzy logic'; 'artificial intelligence'; and 'image recognition' systems. These types of automated systems may be used to review and interpret non-discrete data inputs and produce results which are discrete and certain. While not always 100% accurate, such computer implemented interpretation systems can have a very high level of accuracy and are quite useful for reducing non-discrete data into machine processable data.

In other versions, a human operator supports an interpretation step. In such versions, an interpretation unit is comprised of: a media player; and a graphical user interface. The media player is arranged to present a graphical and image representations of non-discrete data captured in an exception event. For example, images of various parts of the scene including at least video images of the traffic ahead and the vehicle operator in the operator compartment. The media player may be accompanied by a special purpose graphical user interface having adjustable states which may be manipulated by human operators. The media player may present information in still images, or video image series. These media players may include playback functionality such as timeline rewind, fast forward, slow motion, et cetera. In addition, these media players also present non-image data captured by the vehicle event recorder. Event data relating to acceleration, speed, audio, et cetera is captured at the vehicle event recorder and may be represented graphically at a media player. In most instances, this data is time dependant and is preferably presented with respect to the exception event timeline. Thus, all types of data are synchronized in presentation for a most clear understanding of the scenario about the exception event. Some media players include a timeline graphical element to represent time and to further aid in illustrating the temporal nature of the event.

The graphical user interface is preferably responsive to 'point-and-click' actions via a computer peripheral device characterized as a pointing device; for example a so called 'mouse'. The graphical user interface further includes control elements. These are the devices or objects which one interacts. For example, menus and checkboxes. These control elements each have a present value or 'state' as well as a range of states into which they may be set by a user or operator interacting with the interface by way of the mouse. In addition to a present value, a control might also include a timestamp value. The timestamp value holds a single time value in accordance with any instant in time within the event timeline; a 'static time stamp value'. A graphical user interface may additionally include other control elements characterized as: textbox; dropdown box; listbox; combobox; radio button; checkbox; tabstrips; menus; toolbars; sliders; and spin button, among others.

In best versions, the graphical user interface and said media player are displayed together simultaneously on a common display field such as a computer monitor divided in two portions.

In these systems, database records are arranged with a one-to-one relationship with exception events. That is, for every exception event, there is exactly one corresponding database record. The database interface provides coupling between each control element and a corresponding field of an event record whereby an 'insert' action results in the value state of the control being placed into the event record data field.

One will now fully appreciate how systems may be arranged to process, interpret and analyze data collected in conjunction with vehicle event recorders. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

The invention claimed is:

1. A discretization facility for converting non-discrete data into discrete data comprising:
   a coupling to a vehicle event recorder;
   an interpretation unit; and
   a database interface,
      said coupling to a vehicle event recorder is arranged to convey data captured in an exception event to the interpretation unit,
      said interpretation unit is arranged to review non-discrete portions of data captured in an exception event and to provide a discrete dataset which depends upon an interpretation thereof;
      said database interface is arranged as a data coupling system which inserts members of said discrete dataset into prescribed fields of a cooperative database record,
   said interpretation unit is comprised of:
   a media player; and
   a graphical user interface,
      said media player arranged to present a graphical and image representation of non-discrete data captured in an exception event,
      said graphical user interface is a variable state device whose states are responsive to human inputs.

2. A discretization facility of claim 1, said coupling is characterized as a data conduit between a fixed computer installation and a mobile computing system mounted in a motor vehicle.

3. A discretization facility of claim 2, said coupling is further characterized as a wireless communications link.

4. A discretization facility of claim 1, said interpretation unit comprising interpretation means implemented as a machine.

5. A discretization facility of claim 1, said interpretation means is characterized as a 'fuzzy logic' system operable for reading non-discrete data and producing an interpreted discrete output dataset.

6. A discretization facility of claim 1, said interpretation means is characterized as an 'artificial intelligence' system operable for reading non-discrete data and producing an interpreted discrete output dataset.

7. A discretization facility of claim 1, said interpretation means is characterized as a 'image recognition' system operable for reading non-discrete data and producing an interpreted discrete output dataset.

8. A discretization facility of claim 1, said media player is comprised of display devices for presentation of images or video and graphical representation of data.

9. A discretization facility of claim 8, said video includes those captured in a vehicle event recorder camera coupled to an image field of traffic ahead of the vehicle.

10. A discretization facility of claim 8, said graphical representation of data include graphs of acceleration, speed, or audio data.

11. A discretization facility of claim 8, said graphical representation of data include graphs of an event timeline.

12. A discretization facility of claim 8, said media player displays data synchronized in time with all other data similarly presented.

13. A discretization facility of claim 1, input is made via a computer peripheral characterized as a pointing device.

14. A discretization facility of claim 1, said graphical user interface is further comprised of a plurality of control elements, each control element having a present value state and a value state range.

15. A discretization facility of claim 14, said graphical user interface is comprised of control elements, including those from the group: textbox; dropdown box; listbox; combobox; radio button; checkbox; tabstrips; menus; toolbars; sliders; and spin button.

16. A discretization facility of claim 14, either of said controls is further coupled to the timeline and includes a static time stamp value.

17. A discretization facility of claim 1, said graphical user interface and said media player are displayed together simultaneously on a common display field.

18. A discretization facility of claim 1, database records are arranged with a one-to-one relationship with exception events.

19. A discretization facility of claim 1, said database interface provides coupling between each control element and a corresponding field of an event record whereby an 'insert' action results in the value state of the control being placed into the event record data field.

* * * * *